United States Patent
Berezin

(10) Patent No.: US 8,462,248 B2
(45) Date of Patent: *Jun. 11, 2013

(54) ACTIVE PIXEL SENSOR WITH MIXED ANALOG AND DIGITAL SIGNAL INTEGRATION

(75) Inventor: Vladimir Berezin, La Crescenta, CA (US)

(73) Assignee: Micron Technology, Inc., Boise, ID (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/965,322

(22) Filed: Dec. 10, 2010

(65) Prior Publication Data

US 2011/0115960 A1    May 19, 2011

Related U.S. Application Data

(63) Continuation of application No. 09/183,389, filed on Oct. 29, 1998, now Pat. No. 7,139,025, and a continuation of application No. 11/529,634, filed on Sep. 29, 2006, now Pat. No. 7,956,912.

(51) Int. Cl.
*H04N 5/335* (2011.01)

(52) U.S. Cl.
USPC .......................................... 348/308

(58) Field of Classification Search
USPC ............... 348/241, 308, 297, 298, 302, 316
See application file for complete search history.

(56) References Cited

U.S. PATENT DOCUMENTS

| | | | |
|---|---|---|---|
| 4,191,967 A | 3/1980 | Dansac et al. | |
| 4,589,079 A | 5/1986 | Peter | |
| 4,647,976 A | 3/1987 | Nakagaki et al. | |
| 4,710,817 A | 12/1987 | Ando | |
| 5,168,528 A | 12/1992 | Field, Jr. | |
| 5,248,971 A | 9/1993 | Mandl | |
| 5,376,811 A | 12/1994 | Ikeda | |
| 5,420,629 A | 5/1995 | Watanabe | |
| 5,665,959 A | 9/1997 | Fossum et al. | |
| 5,812,703 A | 9/1998 | Juen et al. | |
| 5,886,659 A | 3/1999 | Pain et al. | |
| 5,892,541 A | 4/1999 | Merrill | |
| 5,923,369 A | 7/1999 | Merrill et al. | |
| 5,982,318 A | 11/1999 | Yiannoulos | |
| 6,008,486 A | 12/1999 | Stam et al. | |
| 6,115,065 A | 9/2000 | Yadid-Pecht et al. | |
| 6,377,303 B2 | 4/2002 | O'Connor | |
| 6,466,265 B1 | 10/2002 | Lee et al. | |
| 6,583,817 B1 | 6/2003 | Lee | |
| 7,139,025 B1 * | 11/2006 | Berezin | 348/308 |
| 7,956,912 B2 * | 6/2011 | Berezin | 348/308 |
| 2003/0058345 A1 | 3/2003 | Morris | |
| 2003/0117520 A1 * | 6/2003 | Fossum et al. | 348/308 |

* cited by examiner

*Primary Examiner* — Jason Whipkey
(74) *Attorney, Agent, or Firm* — Dickstein & Shapiro LLP

(57) ABSTRACT

An active pixel sensor includes mixed analog and digital signal integration on the same substrate. The analog part of the array forms the active pixel sensor, and the digital part of the array does digital integration of the signal.

40 Claims, 2 Drawing Sheets

BLOCK DIAGRAM OF APS WITH MIXED
ANALOG AND DIGITAL SIGNAL INTEGRATION

BLOCK DIAGRAM OF APS WITH MIXED
ANALOG AND DIGITAL SIGNAL INTEGRATION

ACTIVE PIXEL SENSOR WITH MIXED ANALOG AND DIGITAL SIGNAL INTEGRATION

The present application is a continuation of application Ser. No. 09/183,389, filed Oct. 29, 1998, now U.S. Pat. No. 7,139,025, and application Ser. No. 11/529,634, filed Sep. 29, 2006 now U.S. Pat. No. 7,956,912, the entire disclosures of which are incorporated herein by reference.

BACKGROUND

Active pixel sensors are well known in the art. A basic description of the active pixel sensors found in U.S. Pat. No. 5,471,515, the disclosure of which is incorporated by reference to the extent necessary for proper understanding.

An active pixel sensor, and many other image sensors, have inherent trade-offs. Typically, the trade-off is made between sensitivity, versus motion resolution, versus space resolution.

For example, we obtain sensitivity by increasing the integration time. However, with a higher integration time, motion becomes more choppy, and hence motion sensitivity is decreased. Sensitivity can also be increased by increasing the pixel size. However, space resolution then decreases, again supporting the trade-off.

Integrated circuit designers continually attempt to put more circuitry on a chip. Lines on the chip are becoming smaller: for example, current technology may use a 0.11 micron process for digital circuitry. However, the image sensor, which is effectively analog, may be subject to a physical minimum size. A pixels that has too small a size and/or high gain, would have insufficient capacitance to allow the sensor to obtain the signal to noise ratio required for quality image acquisition.

SUMMARY

The inventor recognized that memory size can form an effective tradeoff against pixel size. The present specification describes receiving information in an analog photosensor array, and integrating that information in on-chip digital memory. According to this system, an analog array is placed on the same substrate with a digital memory. The information from the analog array is sampled periodically, and the integration is carried out in the digital memory.

DESCRIPTION OF THE PREFERRED EMBODIMENTS

Figure 1:
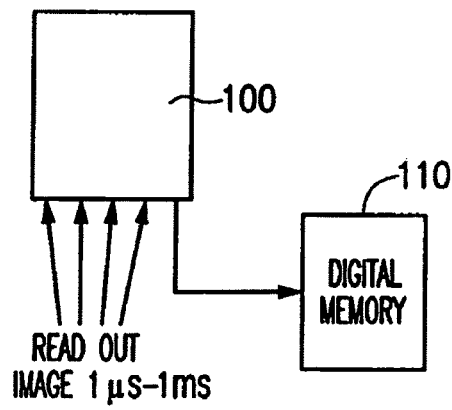
FIG. 1 shows a basic block diagram.

The basic system is shown in FIG. 1. An analog image detector 100, preferably a CMOS image sensor, reads out the image at some time period, e.g., between 1 microsecond and 1 millisecond. Each pixel is coupled to a digital memory 110. Digital memory integrates the instantaneous information received from the pixels.

Current frame times are preferably either 33 milliseconds for a 30-frame per second system, or 16 milliseconds for high motion resolution of 60 milliseconds.

In addition to the other advantages noted above, this architecture allows pixel capacitance to be reduced and pixel gain to be increased, since the pixel need provide only instantaneous values, and does not need to integrate the incoming charge.

The signal integration process is divided into two parts: an analog part in the active pixel sensor 100 and a digital part in digital random access memory.

Figure 2:
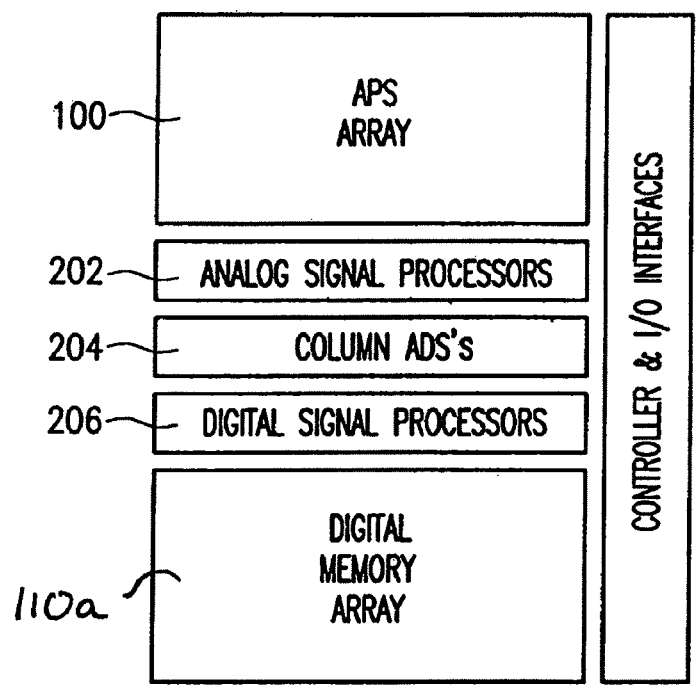
FIGS. 2 and 3 respectively show more detailed block diagrams of the circuitry.

A first embodiment is shown in FIG. 2. FIG. 2 shows the active pixel sensor array 100, coupled with an analog signal processor 202, column A/D converters 204, and a digital signal processor 206. The analog signal processor 202 includes column analog double sampling circuitry both signal and reference to decrease the pixel fixed pattern noise. Preamplifiers, with adjustable gains, can also be used to increase the sensitivity and provide an automatic exposure control, as is known in the art.

The system as described herein uses column parallel A/D conversion, where one separate A/D converter is provided for each column of the active pixel sensor array. In this system, digital integration may be used for oversampling the A/D converter. Digital sampling can reduce the quantization noise density, and hence increase the effective resolution of the system proportionally to arise of the frame bit. Preferably the system operates with an AC input noise of about half of the least significant bit.

Figure 3:
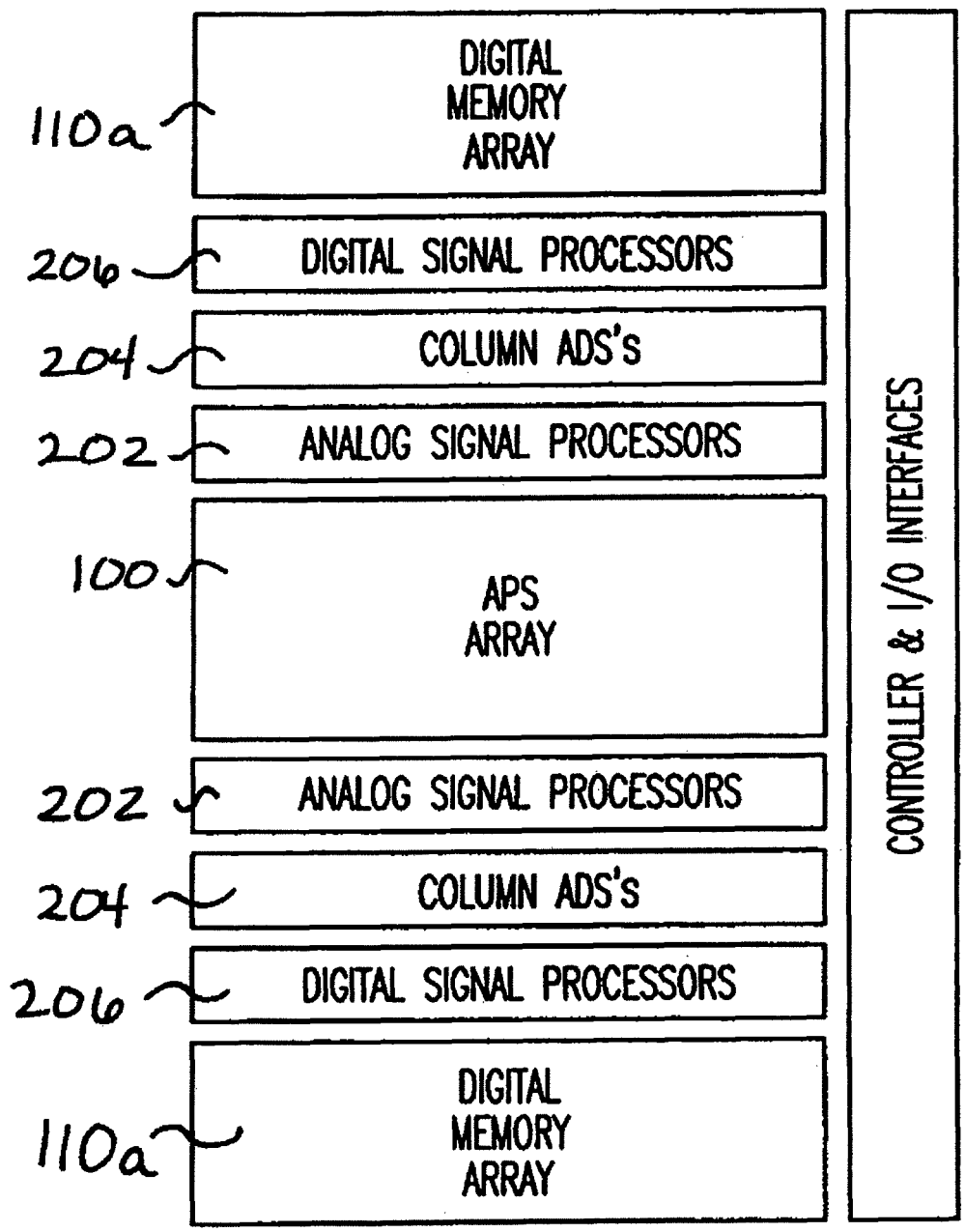

The digital signal processor 206 provides arithmetic operations such as addition, subtraction, division, and multiplication, and also includes a buffer memory to maintain intermediate results. DSP 206 can also act to digitally correct column digital fixed pattern noise. FIG. 3 shows a system similar to that in FIG. 2 but with twice as many digital arrays and processing circuits.

In operation, the sensor is preferably a CMOS image sensor that is of a sufficiently small size that it cannot integrate for a desired frame period. The information from the sensor is sampled by the column A/D converters at an oversampled rate. Each sample is stored in the digital memory array, and the values are integrated in that memory. A digitally integrated value can be subsequently read from the digital memory array.

Although only a few embodiments have been disclosed in detail above, other modifications are possible in the preferred embodiment.

What is claimed is:
1. A method of operating a CMOS image sensor, the method comprising:
 exposing an array of active pixels of the CMOS image sensor to an image;
 reading out a first group of pixel analog signals from the array of pixels, while the pixels continue to generate charge from the exposure to the image, to generate a first group of circuitry analog signals associated with a first exposure of the pixels to the image;
 converting the first group of circuitry analog signals into a corresponding first group of digital signals associated with the first exposure of the pixels to the image;
 storing the first group of digital signals;
 reading out a second group of pixel analog signals from the array of pixels, while the pixels continue to generate charge from the exposure to the image, to generate a second group of circuitry analog signals associated with a second exposure of the pixels to the image;
 converting the second group of circuitry analog signals into a corresponding second group of digital signals associated with the second exposure of the pixels to the image;
 storing the second group of digital signals;

combining the first group of digital signals with the second group of digital signals to produce a final group of digital signals representing the image; storing the final group of digital signals; and reading out the final group of digital signals.

2. The method of claim 1, wherein the step of combining the first group with the second group comprises summing the first group with the second group.

3. The method of claim 1, wherein the converting of the first group of circuitry analog signals and the second group of circuitry analog signals comprises column-parallel analog to digital conversion.

4. The method of claim 1, further comprising performing correlated double-sampling on pixel signals from the array to produce said first and second groups of pixel analog signals.

5. The method of claim 4, wherein said first and second groups of pixel analog signals produced by the correlated double-sampling comprise pixel signals and reference signals respectfully associated with each of the pixel signals.

6. The method of claim 1, further comprising:
reading out a third group of pixel analog signals from the array of pixels, while the pixels continue to generate charge from the exposure to the image, to generate a third group of circuitry analog signals associated with a third exposure of the pixels to the image;
converting the third group of circuitry analog signals into a corresponding third group of digital signals associated with the third exposure of the pixels to the image;
storing the third group of digital signals; and
combining the third group of digital signals with the first and second groups of digital signals to produce the final group of digital signals representing the image.

7. The method of claim 1, wherein reading out the second group of pixel analog signals from the array of pixels occurs without substantially integrating the second group of pixel analog signals.

8. An imager comprising:
an array of active pixels of a CMOS image sensor;
a sampling circuit for reading out a first group of pixel analog signals from the array of pixels to generate a first group of circuitry analog signals associated with a first exposure of the pixels to an image and for reading out a second group of pixel analog signals from the array of pixels to generate a second group of circuitry analog signals associated with a second exposure of the pixels to the image, wherein the sampling circuit reads out the first and second group of pixel analog signals while the pixels continue to generate charge from exposure to the image;
a converter for converting the first group of circuitry analog signals into a corresponding first group of digital signals associated with the first exposure of the pixels to the image and converting the second group of circuitry analog signals into a corresponding second group of digital signals associated with the second exposure of the pixels to the image;
a memory for storing the first and second groups of digital signals; and
a circuit for combining the first and second groups of digital signals to produce a final group of digital signals representing the image.

9. The imager of claim 8, wherein the final group of digital signals is stored in the memory.

10. The imager of claim 8, wherein the combining circuit combines the first and second groups of digital signals by summing the first group of digital signals with the second group of digital signals.

11. The imager of claim 10, wherein the final group of digital signals represents a digital integration of the array of pixels during the first and second exposures of the array of pixels to the image.

12. The imager of claim 8, wherein the sampling circuit is an analog double-sample circuit.

13. The imager of claim 12, wherein the analog double-sample circuit reads out the first group of pixel analog signals and a first group of reference signals, where each of the reference signals is respectfully associated with an analog signal.

14. The imager of claim 8, wherein the converter is a column-parallel analog to digital converter.

15. The imager of claim 8, wherein the sampling circuit reads out a third group of pixel analog signals from the array of pixels to generate a third group of circuitry analog signals associated with a third exposure of the pixels to the image while the pixels continue to generate charge from exposure to the image.

16. The imager of claim 15, wherein the converter converts the third group of circuitry analog signals into a corresponding third group of digital signals associated with the third exposure of the pixels to the image.

17. The imager of claim 16, wherein the memory stores the third group of digital signals.

18. The imager of claim 17, wherein the combining circuit combines the third group of digital signals with the first and second groups of digital signals to produce the final group of digital signals representing the image.

19. The imager of claim 8, wherein the second group of pixel analog signals from the array of pixels is readout by the sampling circuit without substantially integrating the second group of pixel analog signals.

20. An imager comprising:
an array of pixels disposed on a substrate;
a first analog signal processor for processing a plurality of analog signals received from a first pixel in the array of pixels during an integration period of said pixel, wherein said pixel accumulates charge during said integration period and the first pixel is sampled multiple times during the integration period and during each sampling one of the plurality of analog signals is produced, said analog processor providing each of said plurality of analog signals as processed analog signals;
a first circuit for converting each of said processed analog signals to digital signals;
a first digital signal processor for receiving and processing said digital signals; and
a first digital memory for storing said digital signals, wherein said digital signals are accumulated by said imager, the accumulation of which represents a digital integrated value for the integration period of the first pixel.

21. The imager of claim 20, wherein the first circuit for converting said processed analog signals is an oversampling converter.

22. The imager of claim 20, wherein said analog signal processor comprises a column analog double sampling circuitry, wherein said column analog double sampling circuitry comprises a sample circuit for a pixel signal and a sample circuit for a reference signal from said pixel.

23. The imager of claim 20, further comprising:
a second analog signal processor for processing a plurality of analog signals generated by a second pixel in the array during an integration period for the second pixel;

a second circuit for converting said processed analog signals from said second analog processor to digital signals; and a second digital processor for receiving and processing said digital signals from said second circuit.

24. The imager of claim 23, further comprising a second digital memory for storing digital signals from the second digital processor, wherein said first and second digital memories are respectively located on first and second sides of the array of pixels.

25. The imager of claim 20, wherein said first pixel is sufficiently small so that it lacks sufficient capacity to integrate incoming photons for the entirety of said integration period.

26. The imager of claim 20, wherein said first analog signal processor comprises at least one preamplifier with adjustable gain.

27. A method of operating an imager comprising:
capturing an image with a pixel sensor array during an integration period in which pixels in the array accumulate charge;
causing said pixels in the array to each produce electrical signals representing said image;
sampling said electrical signals for each pixel multiple times during said integration period;
converting after every sampling said electrical signals for each pixel to digital signals; and
accumulating and storing said digital signals for each pixel, said accumulated digital signals for each pixel representing a digital integrated signal for said integration period.

28. The method of claim 27, further comprising outputting said integrated signal for each pixel.

29. The method of claim 27, wherein said digital signals for each pixel comprise at least one of each of a light intensity signal and a reference signal.

30. The method of claim 27, wherein at least a first set of said electrical signals is accumulated and stored in a first memory and at least a second set of electrical signals is accumulated and stored in a second memory.

31. The method of claim 30, wherein the act of converting said first set of electrical signals is performed by a first analog to digital converter and the act of converting said second set of electrical signals is performed by a second analog to digital converter.

32. The method of claim 31, further comprising outputting at least one integrated signal from each of said first and second memories.

33. An imager circuit comprising:
an active pixel image sensor array;
at least one circuit for sampling and converting analog information from a plurality of pixels in said array to digital values;
at least one digital memory for storing and accumulating said digital values, wherein said plurality of pixels in said active pixel image sensor array are sampled multiple times during an integration period in which said plurality of pixels accumulate charge and each sampled value is stored and accumulated in said at least one digital memory, said accumulated values representing a respective integrated signal for each pixel during said integration period; and
a controller for controlling the sampling of analog information from said pixels and said storage of digital values in said at least one digital memory.

34. The imager circuit of claim 33, further comprising at least one analog signal processor electrically connected to receive said analog information from said image sensor array and to provide said information to said at least one analog to digital converter.

35. The imager circuit of claim 34, wherein said at least one analog signal processor comprises either at least one preamplifier with adjustable gain or column analog double sampling circuitry.

36. The imager circuit of claim 33, wherein said at least one digital memory comprises first and second digital memories.

37. The imager circuit of claim 36, wherein said first and second digital memories are respectively located on first and second opposite sides of said image sensor array.

38. The imager circuit of claim 36, further comprising first and second digital signal processors for providing respective first and second sets of digital values to said first and second digital memories.

39. An imager comprising:
an array of pixels disposed on a substrate;
a first column analog double sampling circuitry for processing a plurality of analog signals received from a first pixel in the array of pixels during an integration period of said first pixel, wherein the first pixel is sampled multiple times during the integration period and during each sampling one of the plurality of analog signals is produced;
a first converter for converting each of said processed analog signals from said first column analog double sampling circuitry to digital signals;
a first digital signal processor for receiving and processing said digital signals; and
a first digital memory for storing said digital signals, wherein said digital signals stored in said first digital memory are accumulated by said imager, the accumulation of which represents a digital integrated value for the integration period of the first pixel.

40. The imager of claim 39, further comprising:
a second column analog double sampling circuitry for processing a plurality of analog signals received from a second pixel in the array of pixels during an integration period of said second pixel;
a second converter for converting said processed analog signals from said second column analog double sampling circuitry to digital signals;
a second digital signal processor for receiving and processing said digital signals; and
a second digital memory for storing said digital signals, wherein said digital signals stored in said second digital memory are accumulated by said imager, the accumulation of which represents a digital integrated value for the integration period of the second pixel.

* * * * *

UNITED STATES PATENT AND TRADEMARK OFFICE
CERTIFICATE OF CORRECTION

PATENT NO. : 8,462,248 B2
APPLICATION NO. : 12/965322
DATED : June 11, 2013
INVENTOR(S) : Vladimir Berezin It is certified that error appears in the above-identified patent and that said Letters Patent is hereby corrected as shown below:

Title Page, Item (74), under "Attorney, Agent, or Firm", column 2, line 1, delete "Dickstein & Shapiro LLP" and insert -- Dickstein Shapiro LLP --, therefor.

Signed and Sealed this
Seventeenth Day of September, 2013

Teresa Stanek Rea
*Deputy Director of theUnited States Patent and Trademark Office*